D. C. Ripley,

Manf. Glass Lamps.

No. 107,544.    Patented Sep. 20, 1870.

Witnesses:
R. C. Crenshaw
Thos. B. Kerr

Inventor
Daniel C. Ripley,
by Bakewell & Christy,
his Atty's.

United States Patent Office.

DANIEL C. RIPLEY, OF PITTSBURG, PENNSYLVANIA.

Letters Patent No. 107,544, dated September 20, 1870.

IMPROVEMENT IN GLASS LAMPS.

The Schedule referred to in these Letters Patent and making part of the same.

*To all whom it may concern:*

Be it known that I, DANIEL C. RIPLEY, of the city of Pittsburg, in the county of Allegheny and State of Pennsylvania, have invented a new and useful Improvement in the Manufacture of Glass Lamps; and I do hereby declare the following to be a full, clear, and exact description thereof, reference being had to the accompanying drawing making a part of this specification, in which—

Like letters of reference indicate like parts in each.

The nature of my invention consists in the manufacture of glass lamps, or other similar articles of glass-ware, by blowing, in a mold or molds, two or more bowls onto a center piece, stock, or bifurcated stem; and, also, in the production, as a new article of manufacture, of a glass lamp, having two or more bowls blown onto a center piece, stock, or bifurcated stem.

To enable others skilled in the art to make and use my invention, I will proceed to describe its construction and mode of operation.

A is a center-piece, made of glass, of any desired style or design, by being pressed in a suitable mold.

It may represent either the upper end of a lamp-foot or stem, or it may be made with a pin, $a$, to fit into a socket in the upper end of the lamp-stem.

In its central part I make, if so desired, by pressing, in the usual way, a match-box, $b$, to which I fit a cover, $b'$.

The outer edges $c\ c$ I make of the shape, as near as may be, of that part of the lamp-bowl which is to be attached thereto.

I then make a mold with proper cavities for blowing two lamp-bowls, B B, and also with a cavity between the two, in which to place the center-piece A, such cavities being so arranged that the opposite edges $c\ c$ shall rest each in the face of a bowl-cavity.

I then blow in each of the bowl-cavities a lamp-bowl, B, in such way that each bowl will be blown onto or against the center piece A, and form a firm union therewith.

The mold is then opened and the double lamp removed.

Figure 3:
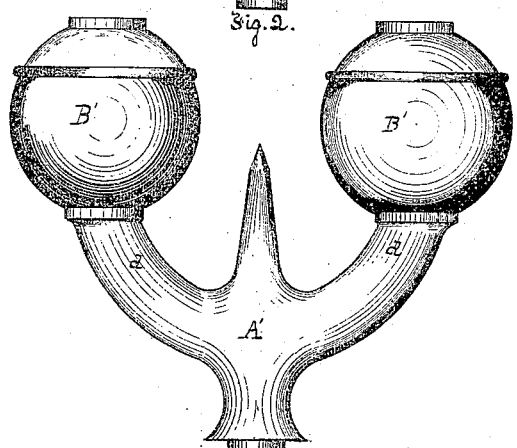
Figure 3 is a like view of two lamp-bowls blown onto the ends of a bifurcated stem.
Figure 1:
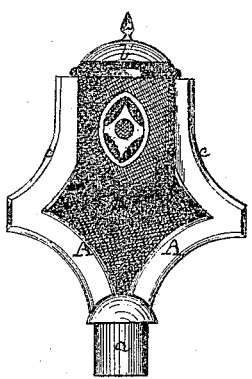
Figure 1 is a side view, somewhat larger than in the other figures, of the central stock or upper part of the stem, onto which I blow the bowls of the lamp.

My principal object being to make a new double glass lamp, I include in my invention the modifications shown in figs. 3 and 4.

As shown in fig. 3, I make a stock or center-piece, A, bifurcated at its upper end, and, in the manner substantially as above described, blow onto the ends of the forks $d\ d$ the bowls B' B'.

Figure 2:
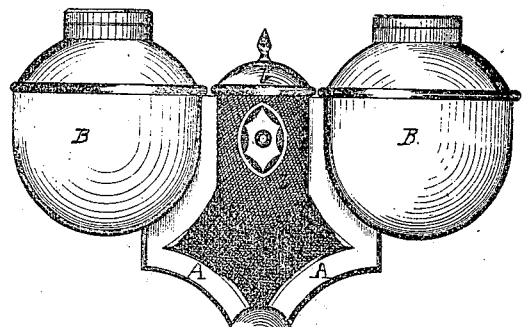
Figure 2 is a like view of the central stock or stem, with two lamp-bowls blown thereon.

The cavity for the stem or stock-piece A' should be made in the lower part of the mold, below the bowl-cavities, instead of between them, as described in reference to fig. 2.

The lamp-bowls may be made with any suitable design or ornamentation.

Glass of different colors may be used in the different parts, at pleasure, so as to add considerably to the neatness of its appearance.

This mode of manufacture is applicable to the making of other articles of glass-ware in which it is desirable to attach two bowls or hollow receptacles of any kind to a central stock or stem, and such application of it I include in my invention.

I do not limit myself to the production and manufacture of articles of glass-ware having two bowls, as by a triplication of the proper parts and cavities such articles may be made with three or more bowls or other hollow receptacles, the mode of manufacture remaining the same; nor do I limit myself to any particular shape or mode of making the stem, stock, or center piece, it only being essential that such stock or center piece should be made with a face or faces properly shaped for seats for the bowls B B B'.

In this way, at small expense, I make a neat, strong, and durable double lamp.

What I claim as my invention, and desire to secure by Letters Patent, is—

A glass lamp, having two or more bowls blown onto a center-piece, stock, or bifurcated stem.

In testimony whereof, I, the said DANIEL C. RIPLEY, have hereunto set my hand.

DANIEL C. RIPLEY.

Witnesses:
B. C. CHRISTY,
G. H. CHRISTY.